(12) United States Patent
Guigon

(10) Patent No.: US 9,908,630 B2
(45) Date of Patent: Mar. 6, 2018

(54) ASSEMBLY FOR AN AIRCRAFT COMPRISING A MOVEABLE ACCESS PANEL

(71) Applicant: Airbus Operations SAS, Toulouse (FR)

(72) Inventor: Frédéric Guigon, Beauteville (FR)

(73) Assignee: Airbus Operations SAS (FR)

( * ) Notice: Subject to any disclaimer, the term of this patent is extended or adjusted under 35 U.S.C. 154(b) by 239 days.

(21) Appl. No.: 14/691,677

(22) Filed: Apr. 21, 2015

(65) Prior Publication Data

US 2015/0307198 A1    Oct. 29, 2015

(30) Foreign Application Priority Data

Apr. 24, 2014    (FR) ...................................... 14 53670

(51) Int. Cl.
 *B64D 27/00* (2006.01)
 *B64D 27/26* (2006.01)
 (Continued)

(52) U.S. Cl.
 CPC ............. *B64D 27/26* (2013.01); *B64D 29/06* (2013.01); *B64D 29/08* (2013.01)

(58) Field of Classification Search
 CPC ................... B64D 27/26; B64D 27/04; B64D 2700/62982; B64D 2027/266;
 (Continued)

(56) References Cited

U.S. PATENT DOCUMENTS 3,209,929 A * 10/1965 Petersen ................ B60V 3/025
 180/124
4,498,701 A *  2/1985 Queveau .................. B60J 7/047
 296/216.05
(Continued)

FOREIGN PATENT DOCUMENTS

FR    2 907 759 A1    5/2008
FR    2 909 639 A1    6/2008
FR    2 926 285 A1    7/2009

OTHER PUBLICATIONS

French Search Report (FR 14 53670) dated Dec. 22, 2014.

*Primary Examiner* — Medhat Badawi
(74) *Attorney, Agent, or Firm* — Lerner, David, Littenberg, Krumholz & Mentlik, LLP

(57) ABSTRACT

An assembly for an aircraft with an engine includes an attachment device intended to support the engine, a pod intended to surround the engine and including a cover, joints intended to allow articulation of the cover and allow movement of the cover relative to the attachment device between a closed position and an open position, and at least one access panel mounted moveably on the cover between a closed position, in which the access panel extends continuously between the cover and the attachment device when the cover is in the closed position, and an open position in which the access panel is remote from its closed position. The assembly includes a handle which can be operated from the outside of the cover between a first position and a second position, and a transmission system provided to move said or each access panel from its closed position to its open position.

10 Claims, 7 Drawing Sheets

(51) Int. Cl.
*B64D 29/06* (2006.01)
*B64D 29/08* (2006.01)

(58) Field of Classification Search
CPC .............. B64D 27/18; B64D 2027/268; B64D 2700/62956; B64D 27/12; B64D 27/00; B64D 29/06; F02K 1/70; F02K 1/72; F02K 1/60; F02K 1/763; F02K 1/766; F01D 25/28; F04D 29/601; H05K 7/20172; G06F 1/20; H01L 2924/0002; Y02T 50/671; Y02T 50/672
See application file for complete search history.

(56) References Cited

U.S. PATENT DOCUMENTS

| | | | | |
|---|---|---|---|---|
| 5,031,959 A | * | 7/1991 | Queveau | B60J 7/22 296/216.03 |
| 5,289,615 A | * | 3/1994 | Banks | B64C 1/1407 16/366 |
| 5,609,313 A | * | 3/1997 | Cole | B64D 29/00 244/54 |
| 5,915,765 A | | 6/1999 | Sternberger | |
| 8,128,022 B2 | * | 3/2012 | Bulin | B64D 29/06 244/53 R |
| 8,844,861 B2 | * | 9/2014 | Balk | B64D 27/26 244/53 R |
| 2010/0038492 A1 | * | 2/2010 | Sclafani | B64C 7/02 244/199.1 |
| 2010/0284806 A1 | | 11/2010 | Vauchel et al. | |
| 2010/0287910 A1 | | 11/2010 | Joret et al. | |
| 2013/0146716 A1 | * | 6/2013 | Gettinger | B64C 39/024 244/215 |
| 2013/0280052 A1 | * | 10/2013 | Gonidec | B64D 29/06 415/182.1 |
| 2014/0061332 A1 | * | 3/2014 | Dezeustre | F02K 1/72 239/265.19 |
| 2014/0133964 A1 | * | 5/2014 | Ayle | G10K 11/172 415/119 |
| 2015/0232190 A1 | * | 8/2015 | Provost | B64D 29/06 244/54 |

* cited by examiner

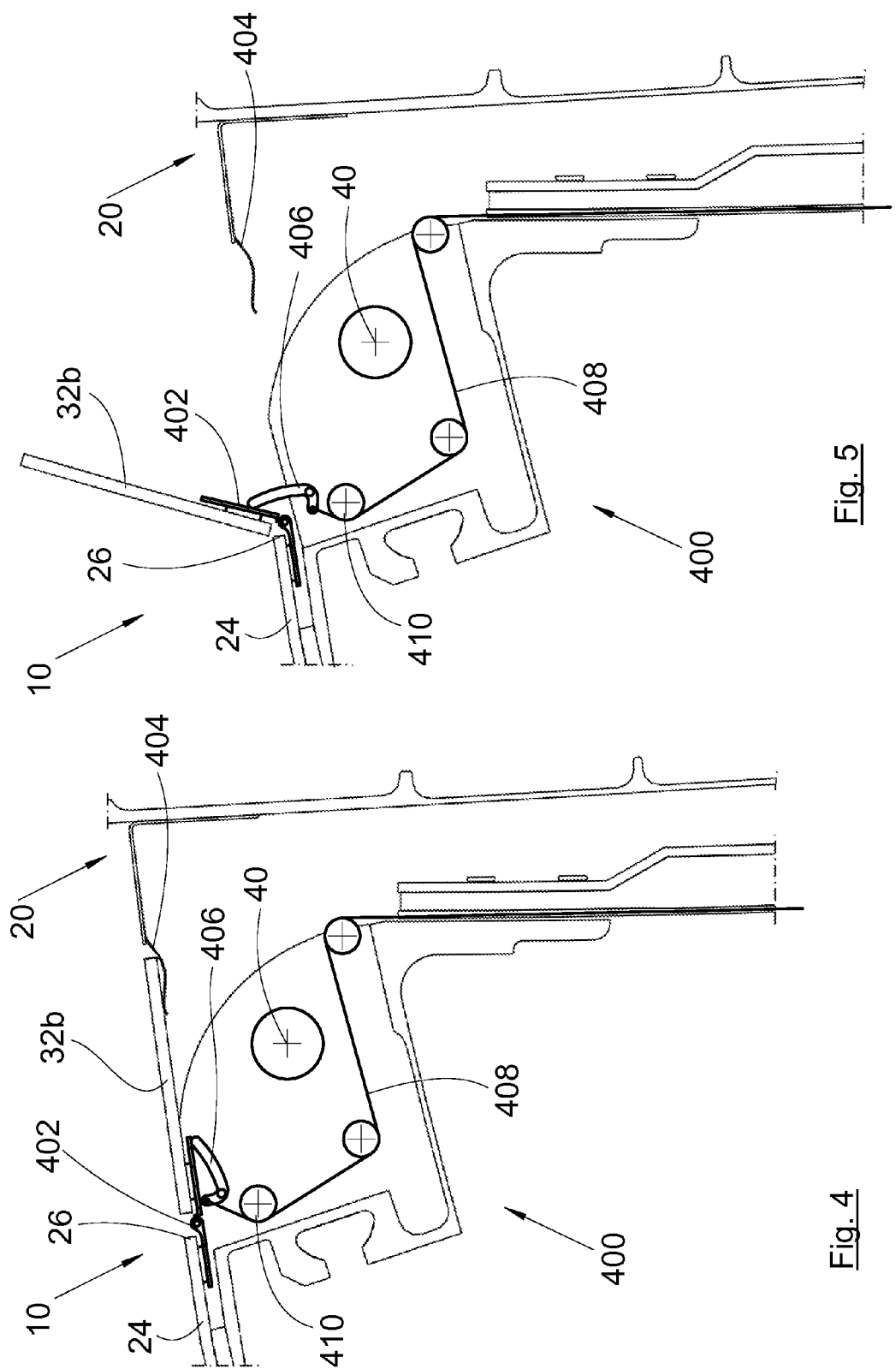

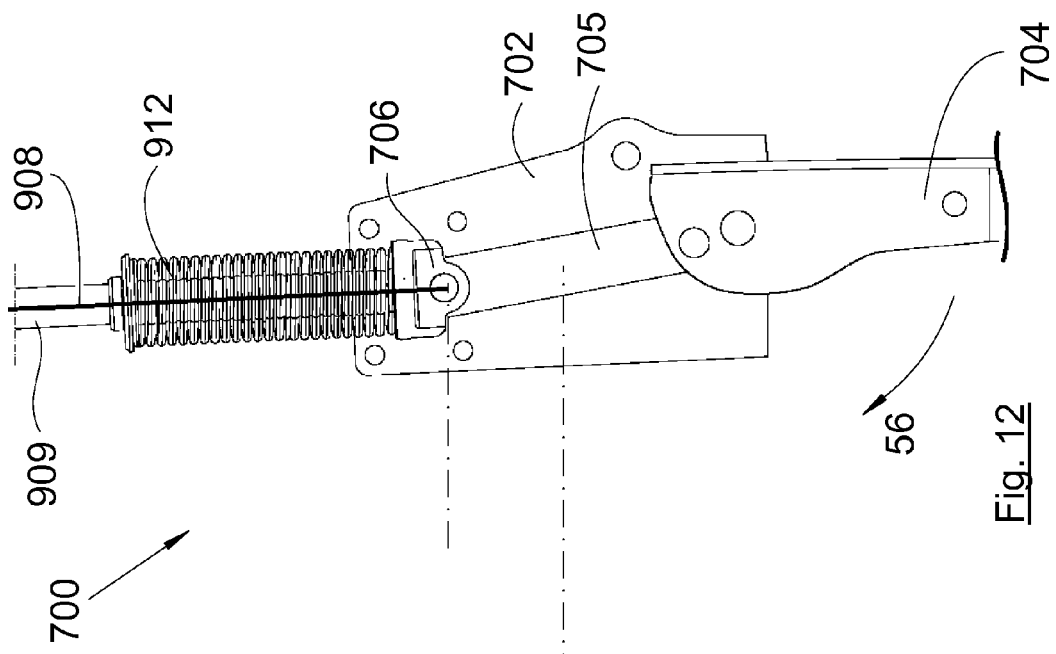
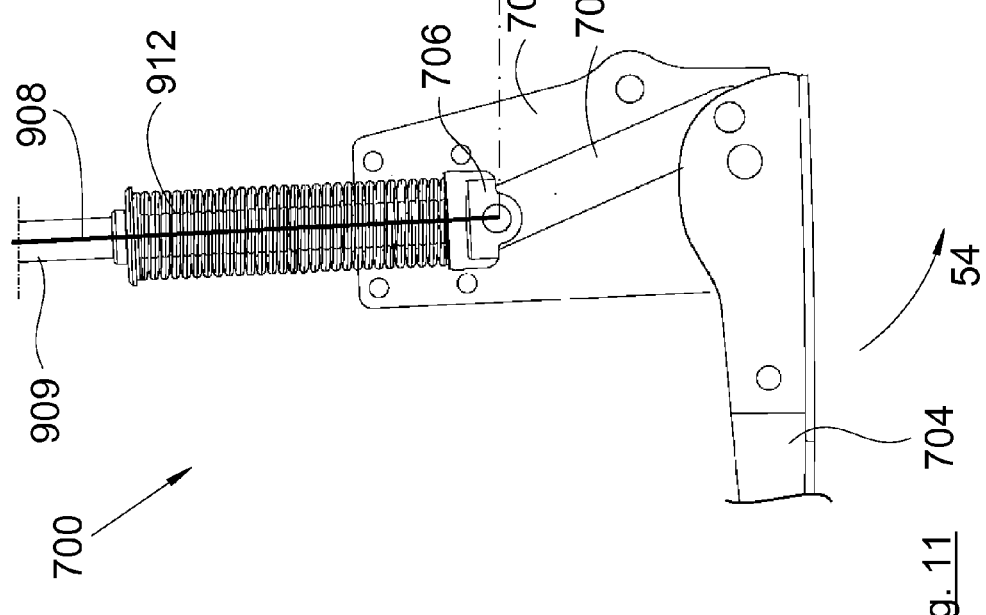

ASSEMBLY FOR AN AIRCRAFT COMPRISING A MOVEABLE ACCESS PANEL

FIELD OF THE INVENTION

The present invention concerns an assembly for an aircraft with an engine fixed to a structure of the aircraft and a pod surrounding the engine, and an aircraft comprising such an assembly. An aircraft conventionally comprises at least one engine and a pod intended to surround this engine.

BACKGROUND OF THE INVENTION

The engine is fixed to the aircraft, in particular to the aircraft wing, via an attachment device also called an attachment mast or engine mounting structure (EMS), which consists of a rigid structure which acts as an interface between the wing structure and the engine, and which thus allows the transmission of forces generated by the engine to the wing structure.

To achieve an aerodynamic structure, the engine is encased in a pod which in particular has thrust reverser covers which are articulated on the attachment mast.

Each engine conventionally comprises two thrust invert covers mounted moveably in rotation on the mast via several joints distributed at the top part of said cover.

To ensure aerodynamic continuity between the pod and the wing, the mast comprises an aerodynamic structure which, amongst others, comes into continuity with the walls of the pod.

To facilitate access to the joints, it is known to equip the pod with removable access panels. These access panels are fixed between the end of the thrust reverser cover, which is mounted on the joints, and the aerodynamic structure.

These access panels are fixed by a screw assembly, and access to the joints necessitates the removal of the access panels and hence the screws.

There is therefore a risk of losing the screws and damaging the access panels during maintenance operations.

BRIEF SUMMARY OF THE INVENTION

An aspect of the present invention is to propose an assembly for an aircraft which does not have the drawbacks of the prior art.

To this end, an assembly is proposed for an aircraft with an engine, said assembly comprising:
- an attachment device intended to support the engine,
- a pod intended to surround the engine and comprising a cover,
- joints intended to allow articulation of the cover and allow movement of the cover relative to the attachment device between a closed position and an open position, and
- at least one access panel,
- said assembly being characterized in that said or each access panel is mounted moveably on the cover between a closed position, in which the access panel extends continuously between the cover and the attachment device when the cover is in the closed position, and an open position wherein the access panel is remote from the closed position,
- and in that it also comprises:
- a handle which can be operated from the outside of the cover between a first position and a second position, and
- a transmission system provided to move said or each access panel from its closed position to its open position when the handle passes from its second position to its first position, and to move the or each access panel from its open position to its closed position when the handle passes from its first position to its second position.

Such an assembly allows permanent fixing of the access panel, thus avoiding any risk of damage to said access panel and risk of loss of screws.

BRIEF DESCRIPTION OF THE DRAWINGS

The characteristics of the invention mentioned above and others will appear more clearly from reading the description below of an exemplary embodiment, said description referring to the attached drawings in which:

FIG. 4 shows a section view, in a plane perpendicular to the longitudinal axis of the pod, of a first embodiment of the assembly according to the invention with the access panel closed, FIG. 5 shows a section view, in a plane perpendicular to the longitudinal axis of a pod, of the assembly according to the first embodiment with the access panel open, FIG. 11 shows an example of a handle in a closed position of the access panel, FIG. 12 shows the handle in FIG. 11 in an open position of the access panel.

DETAILED DESCRIPTION

In the description below, the terms relating to a position refer to an aircraft in the normal operating position, i.e. as shown on FIG. 1.

Figure 1:
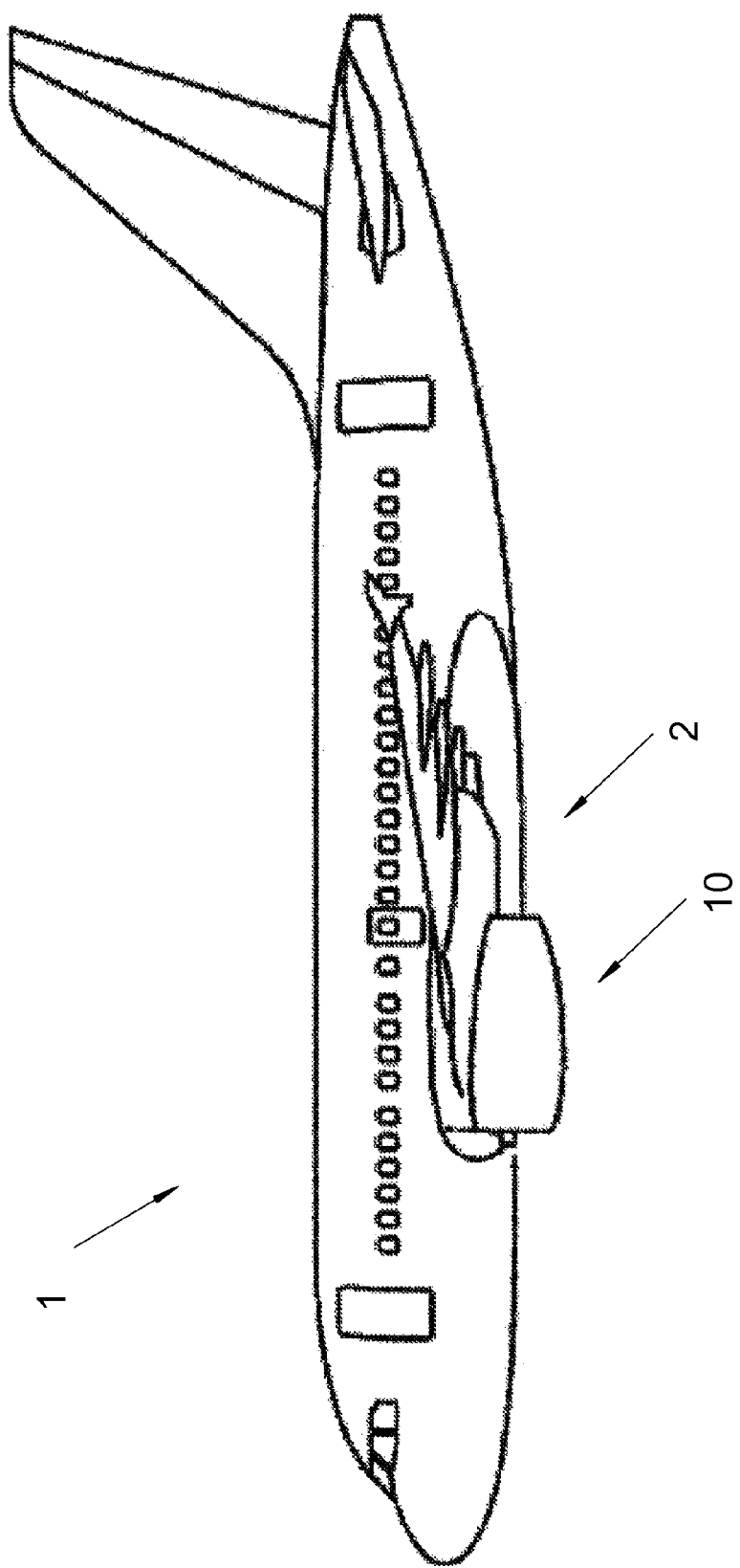
FIG. 1 shows an aircraft equipped with an assembly according to an embodiment of the invention.

FIG. 1 shows an aircraft 1 comprising a wing 2 with an assembly 10 according to an embodiment of the invention, to which an engine is fixed.

Figure 2:
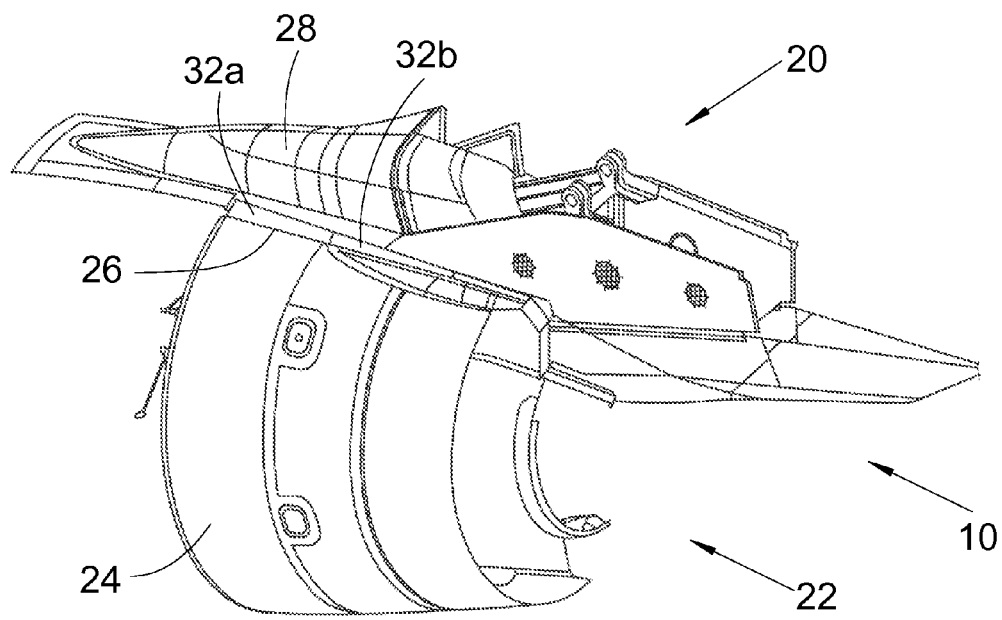
FIG. 2 shows a perspective view of an assembly according to an embodiment of the invention.

FIG. 2 shows the assembly 10 which comprises:
- an attachment device 20 intended to support the engine, and
- a pod 22 intended to surround said engine and comprising at least one cover 24, in particular a thrust reverser cover.

Figure 3:
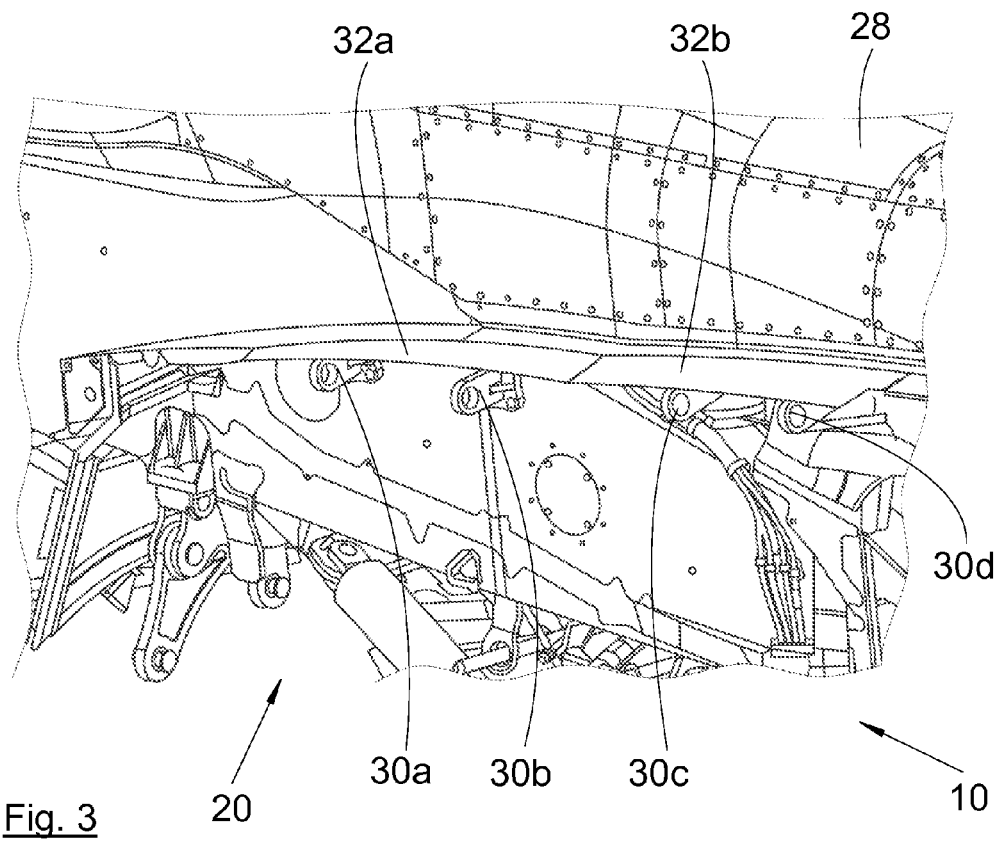
FIG. 3 shows a perspective view of the assembly from FIG. 2 without the thrust reverser cover.

FIG. 3 shows the assembly 10 in which the cover 24 has been removed.

The cover 24 is mounted articulated on joints 30*a-d* which are mounted on the attachment device 20. The joints 30*a-d* are provided to articulate the cover 24 such that the cover 24 is moveable relative to the attachment device 20 between a closed position in which the cover 24 covers the engine, and an open position in which the cover 24 is remote from the engine to allow access for an engineer. The articulation of the cover 24 is more particularly a rotation, the axis of which is substantially parallel to the longitudinal axis of the aircraft 1.

To allow access to joints 30*a-d*, the assembly 10 comprises at least one access panel 32*a-b*, here two in number. The access panel 32*a* allows access to joints 30*a-b* and the access panel 32*b* allows access to joints 30*c-d*.

To create an aerodynamic assembly, the attachment device 20 comprises a fairing 28 which comes into an extension of the access panels 32*a-b* when they are in the closed position.

Each access panel 32*a-b* takes the form of an aerodynamic element.

In the embodiment of the invention shown here, only the access panel 32*b* is mounted moveably on the cover 24 between a closed position, in which the access panel 32*b* extends continuously between the cover 24 and the attachment device 20 when the cover 24 is in the closed position, and an open position, in which the access panel 32*b* is remote from its closed position whether the cover 24 is in the closed position or the open position.

The access panel 32*a* is here fixed to the cover 24 but could also be mounted moveably on the cover 24, like the other access panel 32*b*.

In the closed position, the access panel 32*b* prevents access from the outside to joints 30*c-d*, whereas in the open position the access panel 32*b* is moved so as to allow access from the outside to joints 30*c-d*.

To ensure the movement of the or each access panel 32*b*, this is mounted articulated—here along the upper end 26 of the cover 24—thus preventing its loss or damage during a maintenance operation. The articulation of the access panel 32*b* is more particularly a rotation, the axis of which is substantially parallel to the longitudinal axis of the aircraft 1.

As the access panel 32*b* is fixed to the cover 24, it can advantageously be assembled with said panel 24 before the latter is mounted on the aircraft, hence saving time during assembly of said aircraft. In fact the cover 24 and the access panel 32*b* may be assembled for example by a supplier and delivered together to the final assembly line.

The assembly 10 also comprises a handle which can be operated from the outside of the cover 24 between a first position and a second position, and a transmission system provided to move the or each moveable access panel 32*b* from its closed position to its open position when the handle passes from its second position to its first opening position, and to move the or each access panel 32*b* from its open position to its closed position when the handle passes from its first position to its second position.

In the embodiment of the invention presented here, the first position consists of an open position and the second position consists of a closed position. However, in another embodiment, this could be reversed.

Such an assembly therefore allows simple manipulation of the access panel 32*b* and avoids the use of screw fittings.

In the embodiment of the invention presented here, the cover 24 is articulated at its upper part close to its upper end 26.

The handle is then arranged in the lower part of the cover 24 to allow easy manipulation for an engineer on the ground.

The cover 24 has an outer wall turned towards the outside and a thermal protection arranged inside the outer wall, i.e. between the engine and the outer wall, and which lies opposite the engine in order to limit the transfer of heat from the engine. To protect the transmission system from the engine heat, it is advantageously arranged between the outer wall and the thermal protection.

In the description which follows, the access panel 32*b* is mounted moveably in rotation on the cover 24, here along the upper end 26, via a hinge 402 mounted on the inside relative to the cover 24, in particular via a piano hinge which minimises parasitic drag and allows more effective closure of the space below the access panel 32*b* without it being necessary to use further sealing products.

To ensure the seal at the free edge of the access panel 32*b*, the attachment device 20 has a gasket 404 which extends below the free edge when the access panel 32*b* is in the closed position, and against which said access panel 32*b* rests.

The two embodiments of the transmission system which will now be described are based on the use of a metal cable which allows a gain in mass, and which also allows introduction of a preload into the access panel 32*b*. This preload opposes the aerodynamic forces which tend to draw said access panel 32*b* towards the outside, and hence ensures its stability during flight. These embodiments do not impose any deformation on the access panel 32*b* nor any contact during maneuvering of the cover 24, thus minimising friction and risk of premature wear.

Figure 6:
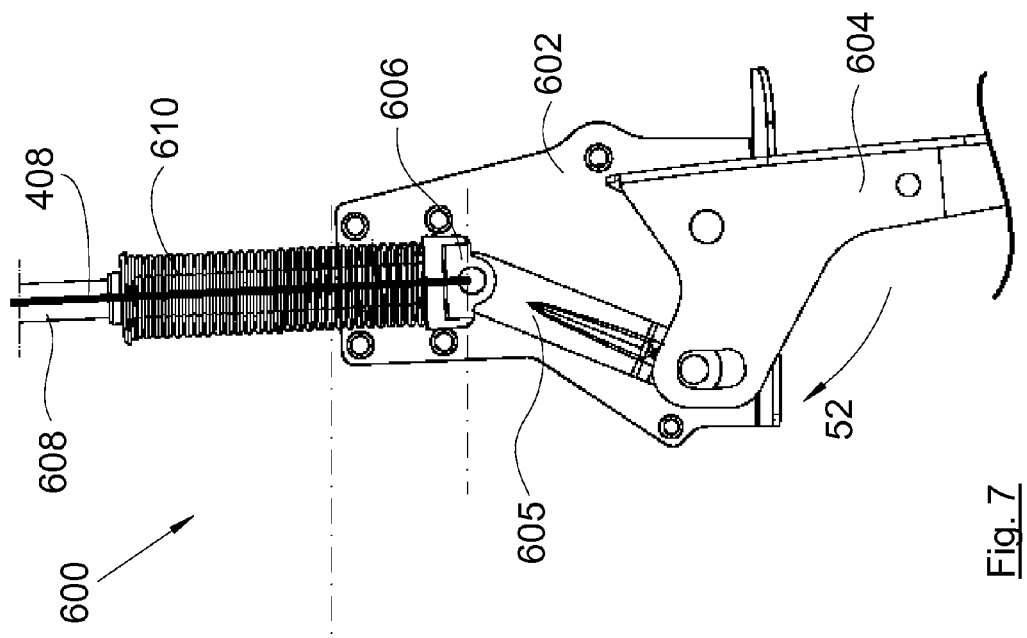
FIG. 6 shows an example of a handle in a closed position of the access panel.
Figure 7:
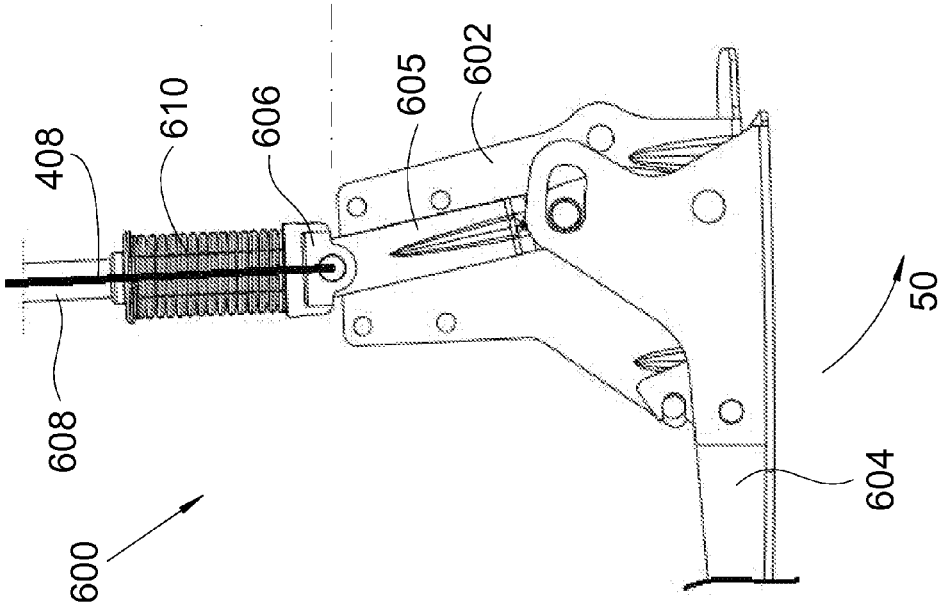
FIG. 7 shows the handle of FIG. 6 in an open position of the access panel.

FIG. 4 and FIG. 5 show the assembly 10 according to a first embodiment and in cross section in a plane perpendicular to the longitudinal axis of the aircraft 1. FIG. 6 and FIG. 7 show an example of the handle 600.

FIGS. 4 and 6 show the assembly 10 with the access panel 32*b* and the handle 600 in the second position, and FIGS. 5 and 7 show the assembly 10 with the access panel 32*b* and handle 600 in the first position.

The transmission system 400 comprises a return means which forces the access panel 32*b* into the closed position. This return means is for example a spring associated with the hinge 402.

The transmission system 400 comprises a lever 406 mounted on the cover 24, on the inside relative to the access panel 32*b*, which is moveable between an extended position (FIG. 5) in which it presses against the access panel 32*b* and forces it into the open position, and a retracted position (FIG. 4) in which it does not force the access panel 32*b*.

The lever 406 here takes the form of an L mounted moveably in rotation, and comprises a first bar actuating the access panel 32*b* and a second bar.

The transmission system 400 also comprises a cable 408, one end of which is fixed to the handle 600 and the other end of which is fixed to the second bar of the lever 406.

The cable 408 is routed from the lever 406 to the handle 600 along a series of pulleys 410 fixed to the cover 24.

The handle 600 comprises a base 602 which is fixed to the cover 24, an actuator 604 mounted moveably in rotation on the base 602, a cable carrier 606 integral with the cable 408 and mounted moveably in translation on the base 602 parallel to cable 408, and a strut 605 mounted moveably in rotation at one of its ends on the actuator 604 and at the other of its ends on the cable carrier 606.

In the closed position, the rotation point of the actuator 604, the rotation point of the strut 605 on the actuator 604, and the rotation point of the strut 605 on the cable carrier 606 are substantially aligned, and the rotation point of the strut 605 on the actuator 604 is arranged between the two other points. Thus rotation of the actuator 604 causes a shift in the rotation point of the strut 605 on the actuator 604 and hence a pull on the cable carrier 600.

Thus from the closed position (FIG. 4 and FIG. 6), when an engineer operates the actuator 604, this pivots relative to the base 602 (arrow 50), thus pulling the cable carrier 606 by action of the strut 605 and hence also pulling the cable 408. The cable 408 then causes the swiveling of the lever 406, which pushes the access panel 32*b* which passes to the open position.

In reverse, from the open position (FIG. 5 and FIG. 7), when an engineer operates the actuator 604, this pivots relative to the base 602 (arrow 52) thus repelling the cable carrier 606 by action of the strut 605. The cable 408 is then released. The lever 406 then swivels and returns to its retracted position under the action of the access panel 32*b*, which passes into its closed position under the action of the return means.

To ensure the tension on cable 408 between the handle 600 and the first pulley, cable 408 is introduced into a sheath 608, one end of which is held fixed close to the pulley and the other end of which is mounted on the cable carrier 606 via a compression spring 610.

Figure 8:
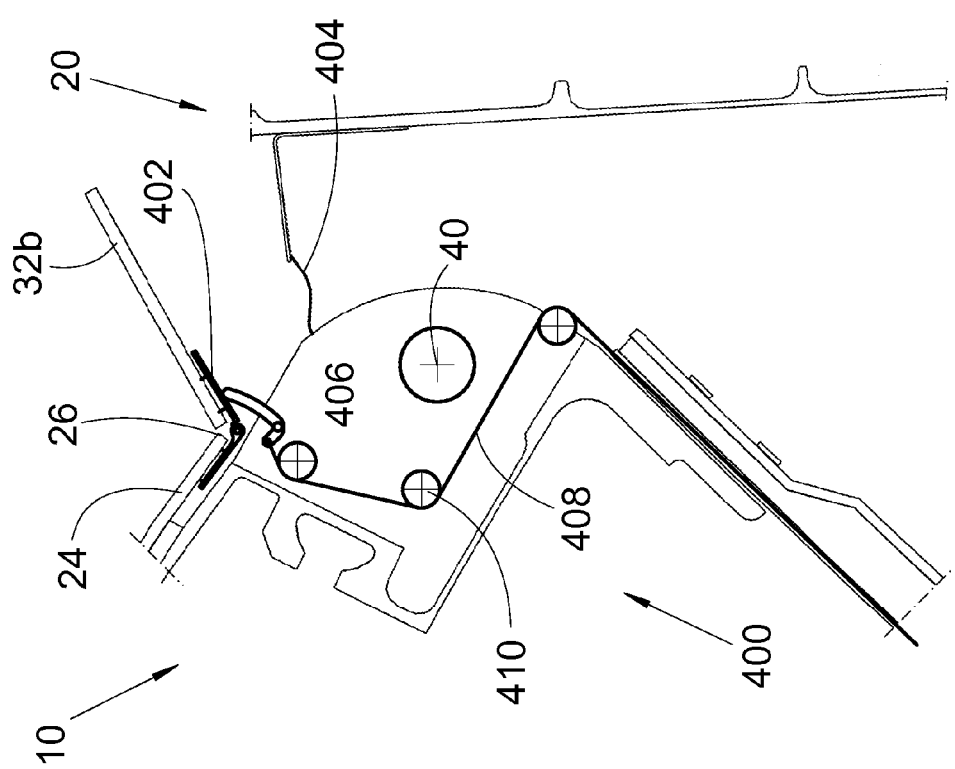
FIG. 8 shows a section view, in a plane perpendicular to the longitudinal axis of a pod, of the assembly according to the first embodiment with the thrust reverser cover open.

FIG. 8 shows the assembly 10 in a position where the cover 24 is in the open position after rotation around the axis 40 of joints 30*a-d*, and where the access panel 32*b* is in the open position. Passage of the access panel 32*b* to the open position before opening of the cover 24 allows avoidance of any contact between said access panel 32*b* and the attachment device 20, in particular the fairing 28.

The fact that the transmission system 400 and handle 600 are mounted on the cover 24 allows the access panel 32*b* to be held in the open position despite the pivoting of the cover 24, since it is the assembly of the transmission system 400 and handle 600 which pivots.

Figure 10:
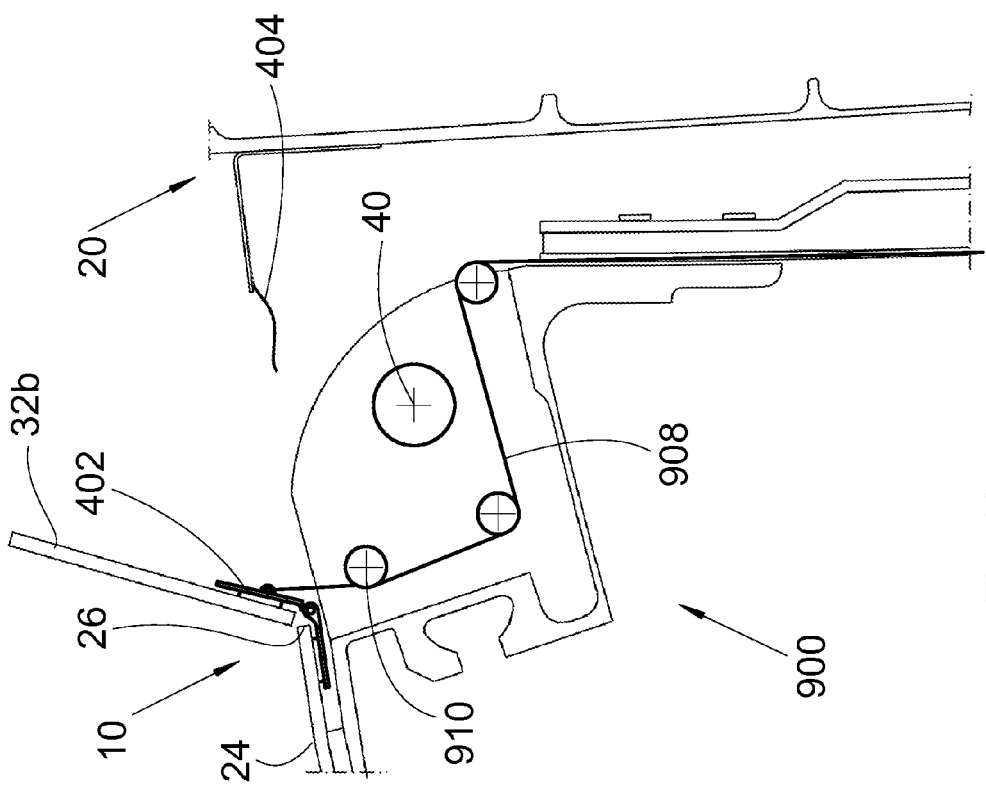
FIG. 10 shows a section view, in a plane perpendicular to the longitudinal axis of a pod, of the assembly according to the second embodiment with the access panel open.
Figure 9:
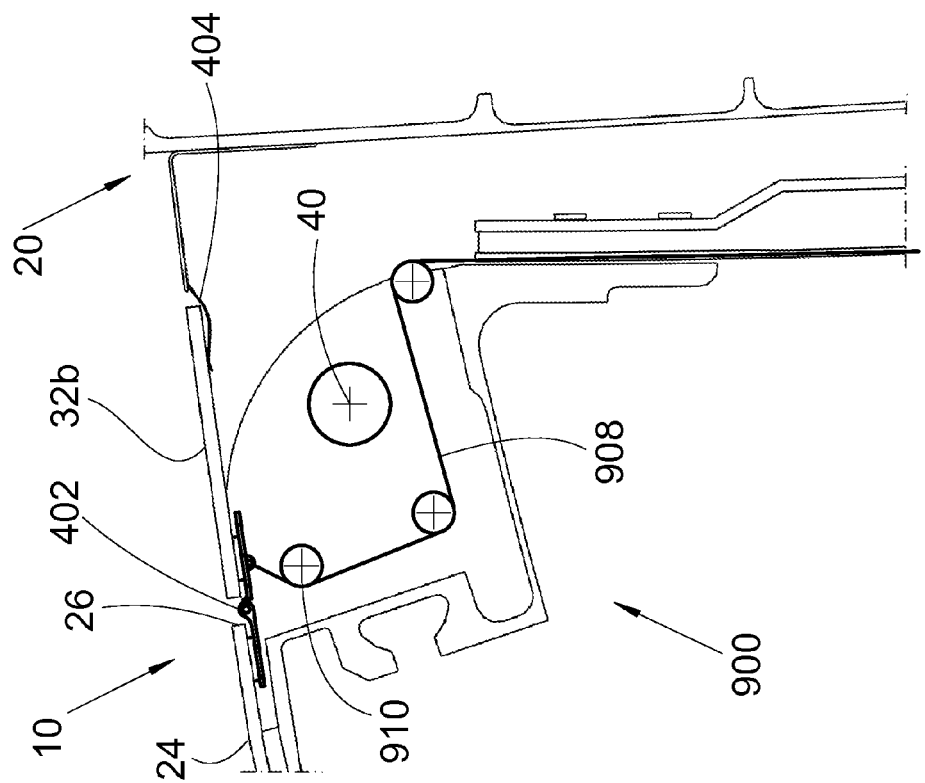
FIG. 9 shows a section view, in a plane perpendicular to the longitudinal axis of a pod, of a second embodiment of the invention with the access panel closed.

FIG. 9 and FIG. 10 show the assembly 10 in a second embodiment and in cross section along a plane perpendicular to the longitudinal axis of the aircraft 1. FIG. 11 and FIG. 12 show an example of the handle 700.

FIGS. 9 and 11 show the assembly 10 with the access panel 32*b* and the handle 700 in the second position, and FIGS. 10 and 11 show the assembly 10 with the access panel 32*b* and the handle 700 in the first position.

The transmission system 900 comprises a return means which forces the access panel 32*b* into the open position. This return means is for example a spring associated with the hinge 402.

The transmission system 900 comprises a cable 908, one end of which is fixed to the handle 700, and the other end of which is fixed to the access panel 32*b*; in the embodiment of the invention shown on FIGS. 9 and 10, the other end is fixed to the part of the hinge 402 which is fixed to the access panel 32*b*.

The cable 908 is routed from the access panel 32*b* to the handle 700 along a series of pulleys 910 which are fixed to the cover 24.

The handle 700 comprises a base 702 which is fixed to the cover 24, an actuator 704 mounted moveably in rotation along the base 702, a cable carrier 706 integral with the cable 908 and mounted moveably in translation on the base 702 parallel with the cable 908, and a strut 705 mounted moveably in rotation by one of its ends on the actuator 704 and by the other of its ends on the cable carrier 706.

In the closed position, the rotation point of the actuator 704, the rotation point of the strut 705 on the actuator 704, and the rotation point of the strut 705 on the cable carrier 706 are not aligned, and the rotation point of the strut 705 on the actuator 704 is arranged such that on passage from the closed position to the open position, the rotation point of the strut 705 on the actuator 704 comes into alignment between the rotation point of the actuator 704 and the rotation point of the strut 705 on the cable 706, thus tending to repel the cable carrier 706.

Thus from the closed position (FIG. 9 and FIG. 11), when an engineer operates the actuator 704, this pivots relative to the base 702 (arrow 54), thus repelling the cable carrier 706 by actuation of the strut 705, and hence also repelling the cable 908. The cable 908 is then relaxed and under the action of the return means, the access panel 32*b* passes to the open position.

In reverse, from the open position (FIG. 10 and FIG. 12), when an engineer operates the actuator 704, this pivots relative to the base 702 (arrow 56) thus pulling the cable carrier 706 by actuation of the strut 705 and hence also the cable 908. The cable 908 then tightens and pulls the access panel 32*b*, which passes to the closed position.

To ensure the tension on the cable 908 between the handle 700 and the first pulley, the cable 908 is introduced into a sheath 909, one of which is held fixed close to the pulley and the other end of which is mounted on the cable carrier 706 via a compression spring 912.

Figure 13:
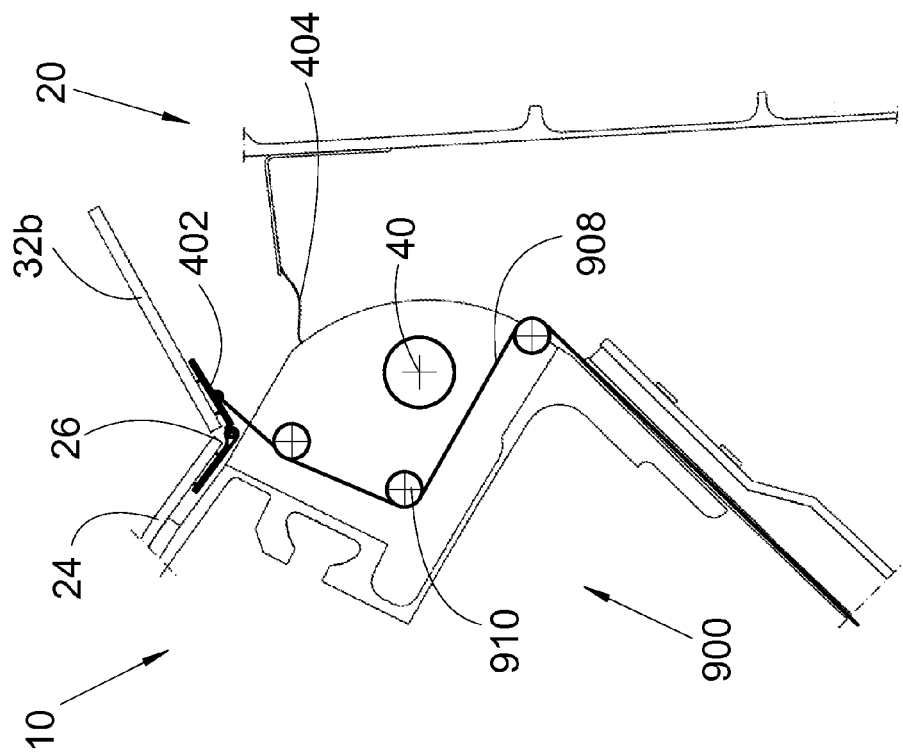
FIG. 13 shows a section view, in a plane perpendicular to the longitudinal axis of a pod, of the assembly according to the second embodiment with the thrust reverser cover open.

FIG. 13 shows the assembly 10 in a position where the cover 24 is in the open position after rotation around the axis 40 of joints 30*a-d*, and where the access panel 32*b* is in the open position. The passage of the access panel 32*b* to the open position before opening of the cover 24 allows avoidance of any contact between said access panel 32*b* and the attachment device 20, in particular the fairing 28.

The fact that the transmission system 900 and handle 700 are mounted on the cover 24 allows the access panel 32*b* to be held in the open position despite the pivoting of the cover 24, since it is the assembly of the transmission system 900 and handle 700 which pivots.

In general, the fact that the handles 600, 700 and the transmission system 400, 900 are mounted on the cover 24 allows the cover 24 to be opened or closed without this affecting the open or closed position of the access panel 32*b*.

When the handle is arranged in the lower position of the cover 24, it is advantageously the same handle as that which locks the cover 24 in the closed position and unlocks it to move it from the closed position to the open position. The handle which locks the cover 24 allows the cover 24 to be blocked in the closed position, and it is provided to release the cover 24 in the unlocked position and allow it to pass to the open position. Such a handle locks the free edge (here the lower edge) of one cover 24 against the free edge of the other cover 24.

The use of a handle and a transmission system comprising a cable and pulleys allows a simple, lightweight mechanism which takes up little space. Also operation is flexible, smooth and with little friction through the pulleys and sheaths.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly, said assembly comprising:
   an attachment device configured to support the engine and comprising a gasket: a pod configured to surround the engine and comprising a cover;
   a plurality of joints mounted on the attachment device and configured to allow articulation of the cover and allow movement of the cover relative to the attachment device between a closed position and an open position; and
   at least one access panel having a free edge,
   wherein said at least one access panel is mounted moveably on the cover between a closed position, in which the access panel extends continuously between the cover and the attachment device when the cover is in the closed position with the free edge of the at least one access panel resting against the gasket, and an open position in which the access panel is remote from the closed position of the at least one access panel, the at least one access panel configured to rotate in a first rotational direction when moving from the closed position to the open position and the cover is configured to rotate in a second rotational direction, opposite to the first rotational direction, when moving from the closed position to the open position, and wherein the assembly comprises:
   a handle operated from the outside of the cover between a first position and a second position; and
   a transmission system configured to move said at least one access panel from the closed position of the at least one access panel to the open position of the at least one access panel when the handle passes from the second position of the handle to the first position of the position of the handle, and to move said at least one access panel from the open position of the at least one access panel to the closed position of the at least one access panel when the handle passes from the first position of the handle to the second position of the handle.

2. The assembly according to claim 1, wherein the cover is articulated at an upper part of the cover and the handle is arranged in a lower part of the cover.

3. The aircraft engine assembly according to claim 2, wherein the handle selectively locks and unlocks the cove.

4. The aircraft engine assembly according to claim 1, wherein the handle and the transmission system are mounted on the cover.

5. The aircraft engine assembly according to claim 1, wherein the cover has an outer wall turned towards the outside and a thermal protection arranged inside the cover, and the transmission system is arranged between the outer wall and the thermal protection.

6. The aircraft engine assembly according to claim 1, wherein said least one access panel is mounted moveably in rotation on the cover via a hinge mounted on the inside relative to the cover.

7. The aircraft engine assembly according to claim 6, wherein the hinge is a piano hinge.

8. The aircraft engine assembly according to claim 1, wherein the transmission system comprises:
   a return means configured to force the at least one access panel into the closed position;
   a lever mounted moveably between an extended position in which the lever presses against the at least one access panel and forces the at least one access panel into the open position, and a retracted position in which the lever does not force the at least one access panel;
   a cable, one end of which is fixed to the handle and the other end of which is fixed to the lever; and
   a set of pulleys along which the cable is routed.

9. The aircraft engine assembly according to claim 1, wherein the transmission system comprises:
   a return means configured to force the at least one access panel into the open position,
   a cable, one end of which is fixed to the handle and the other end of which is fixed to the at least one access panel, and
   a set of pulleys along which the cable is routed.

10. An aircraft comprising an engine and an assembly, the assembly comprising:
    an attachment device configured to support the engine and comprising a gasket: a pod configured to surround the engine and comprising a cover;
    a plurality of joints configured to allow articulation of the cover and allow movement of the cover relative to the attachment device between a closed position and an open position; and at least one access panel having a free edge,
    wherein said at least one access panel is mounted moveably on the cover between a closed position, in which the access panel extends continuously between the cover and the attachment device when the cover is in the closed position with the free edge resting against the gasket, and an open position in which the access panel is remote from the closed position of the at least one access panel, the at least one access panel configured to rotate in a first rotational direction when moving from the closed position to the open position and the cover is configured to rotate in a second rotational direction, opposite to the first rotational direction, when moving from the closed position to the open position,
    wherein the assembly comprises:
    a handle operated from the outside of the cover between a first position and a second position; and
    a transmission system configured to move said at least one access panel from the closed position of the at least one access panel to the open position of the at least one access panel when the handle passes from the second position of the handle to the first position of the handle, and to move said at least one access panel from the open position of the at least one access panel to the closed position of the at least one access panel when the handle passes from the first position of the handle to the second position of the handle, wherein the attachment device is configured to support the engine, and wherein the pod is configured to surround the engine.

* * * * *